US009991517B2

United States Patent
Imaji et al.

(10) Patent No.: US 9,991,517 B2
(45) Date of Patent: Jun. 5, 2018

(54) CARBONACEOUS MATERIAL FOR NON-AQUEOUS ELECTROLYTE SECONDARY BATTERY ANODE, NON-AQUEOUS ELECTROLYTE SECONDARY BATTERY ANODE, NON-AQUEOUS ELECTROLYTE SECONDARY BATTERY, AND VEHICLE

(71) Applicant: Kureha Corporation, Tokyo (JP)

(72) Inventors: Makoto Imaji, Tokyo (JP); Kayoko Okada, Tokyo (JP); Yasuhiro Tada, Tokyo (JP); Naohiro Sonobe, Tokyo (JP); Mayu Komatsu, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days. days.

(21) Appl. No.: 15/300,304

(22) PCT Filed: Mar. 27, 2015

(86) PCT No.: PCT/JP2015/059768
§ 371 (c)(1),
(2) Date: Sep. 29, 2016

(87) PCT Pub. No.: WO2015/152088
PCT Pub. Date: Oct. 8, 2015

(65) Prior Publication Data
US 2017/0141394 A1 May 18, 2017

(30) Foreign Application Priority Data
Mar. 31, 2014 (JP) .................... 2014-074972

(51) Int. Cl.
*H01M 4/587* (2010.01)
*H01M 10/0525* (2010.01)
*C01B 31/02* (2006.01)
*H01M 4/02* (2006.01)

(52) U.S. Cl.
CPC ............ *H01M 4/587* (2013.01); *C01B 31/02* (2013.01); *H01M 10/0525* (2013.01); *C01P 2004/61* (2013.01); *C01P 2006/10* (2013.01); *C01P 2006/12* (2013.01); *C01P 2006/40* (2013.01); *H01M 2004/021* (2013.01); *H01M 2004/027* (2013.01); *H01M 2220/20* (2013.01)

(58) Field of Classification Search
CPC ............ H01M 4/587; H01M 10/0525; H01M 2220/20; H01M 2004/021; H01M 2004/027; C01B 31/02; C01P 2006/40; C01P 2004/61; C01P 2006/12; C01P 2006/10

See application file for complete search history.

(56) References Cited

U.S. PATENT DOCUMENTS

| 5,601,950 | A | 2/1997 | Yamahira et al. |
|---|---|---|---|
| 5,772,974 | A | 6/1998 | Ohashi et al. |
| 6,303,249 | B1 | 10/2001 | Sonobe et al. |
| 6,335,122 | B1 | 1/2002 | Yamada et al. |
| 7,718,307 | B2 | 5/2010 | Shimizu et al. |
| 2007/0287068 | A1 | 12/2007 | Shimizu et al. |
| 2009/0297953 | A1* | 12/2009 | Shimizu ............... H01M 4/587 429/231.95 |
| 2014/0065486 | A1 | 3/2014 | Ono et al. |
| 2015/0188137 | A1* | 7/2015 | Komatsu ............... H01M 4/587 429/231.8 |
| 2016/0064735 | A1 | 3/2016 | Tada et al. |

FOREIGN PATENT DOCUMENTS

| CN | 1255244 A | 5/2000 |
|---|---|---|
| EP | 1 739 771 A1 | 1/2007 |
| EP | 2 187 468 A1 | 5/2010 |
| EP | 2 894 702 A1 | 7/2015 |
| JP | H08222273 A | 8/1996 |
| JP | H08279358 A | 10/1996 |

(Continued)

OTHER PUBLICATIONS

International Search Report of PCT/JP2015/059768 dated Jun. 30, 2015.
Extended European Search Report dated Nov. 24, 2016, in European Patent Application No. 15774007.7.
Office Action dated Jan. 18, 2016, in Taiwan Patent Application No. 104110535, with English translation.
Notification of Reasons for Rejection dated May 9, 2017, in Japanese Patent Application No. 2016-511637, with English translation.
Japanese Notification of Reasons for Refusal for Application No. 2016-511637, dated Dec. 5, 2017, with English language translation.
Chinese Office Action and Search Report dated Mar. 2, 2018 for corresponding Chinese Application No. 201580016423.5, with an English translation.

*Primary Examiner* — Stewart A Fraser
(74) *Attorney, Agent, or Firm* — Birch, Stewart, Kolasch & Birch, LLP

(57) ABSTRACT

Provided is a carbonaceous material for a non-aqueous electrolyte secondary battery anode having high discharge capacity per unit volume and excellent storage characteristics.

The carbonaceous material for a non-aqueous electrolyte secondary battery anode of the present invention has a true density ($\rho_{Bt}$) determined by a pycnometer method using butanol of not less than 1.55 g/cm$^3$ and less than 1.75 g/cm$^3$ and a discharge capacity of an anode at 0.05 V to 1.5 V in terms of a lithium reference electrode standard of not less than 180 mAh/g. Furthermore, the slope 0.9/X (Vg/Ah) of a discharge curve calculated from a discharge capacity X (Ah/g) and a potential difference of 0.9 (V) corresponding to 0.2 V to 1.1 V in terms of a lithium reference electrode standard is not greater than 0.75 (Vg/Ah), and an absorbed moisture quantity after storage for 100 hours in a 25° C. 50% RH air atmosphere is not greater than 1.5 wt %.

8 Claims, No Drawings

(56) References Cited

FOREIGN PATENT DOCUMENTS

| | | |
|---|---|---|
| JP | H1021919 A | 1/1998 |
| JP | 2003328911 A | 11/2003 |
| JP | 2008047456 A | 2/2008 |
| TW | I357678 B | 2/2012 |
| WO | 2005098999 A1 | 10/2005 |
| WO | 2014034431 A1 | 3/2014 |
| WO | 2014034858 A1 | 3/2014 |
| WO | WO 2014/038491 A1 | 3/2014 |

* cited by examiner

CARBONACEOUS MATERIAL FOR NON-AQUEOUS ELECTROLYTE SECONDARY BATTERY ANODE, NON-AQUEOUS ELECTROLYTE SECONDARY BATTERY ANODE, NON-AQUEOUS ELECTROLYTE SECONDARY BATTERY, AND VEHICLE

TECHNICAL FIELD

The present invention relates to a carbonaceous material for a non-aqueous electrolyte secondary battery anode, a non-aqueous electrolyte secondary battery anode, a non-aqueous electrolyte secondary battery, and a vehicle.

BACKGROUND ART

In recent years, the notion of mounting large lithium-ion secondary batteries, having high energy density and excellent output energy characteristics, in electric vehicles has been investigated in response to increasing concern over environmental issues. In particular, lithium-ion secondary batteries for automobiles are difficult to replace at an intermediate stage due to their large size and high cost. Therefore, the lithium-ion secondary batteries for vehicles are required to have at least the same durability as that of vehicles and demanded to have a product life of 10 years or longer (high durability). When graphitic materials are used, there is a tendency for damage to occur due to crystal expansion and contraction caused by repeated lithium doping and de-doping, which diminishes the charge/discharge repetition performance. Therefore, such materials are not suitable as anode materials for lithium-ion secondary batteries for vehicles which require high cycle durability. In contrast, carbonaceous materials such as non-graphitizable carbon, of which the graphite structure does not reach a high degree, are suitable for use in automobile applications from the perspective of involving little particle expansion and contraction due to lithium doping and de-doping and having high cycle durability.

Furthermore, in the latest lithium-ion secondary batteries for vehicles, increased discharge capacity is required to extend the cruising range on a single charge and to improve vehicle fuel consumption. There is also a demand for increased discharge capacity per unit volume because of the need to reduce the installation space of the battery. A known means for increasing capacity is to promote the development of pores by performing heat treatment under reduced pressure or in a chlorine atmosphere in the manufacturing process of the carbonaceous material (Patent Documents 1, 2). However, the carbonaceous material manufactured by these methods has poor storage stability. In contrast, it has also been proposed to improve storage stability by increasing the amount of closed pores in the carbonaceous material (Patent Document 3), but this brings about the undesired result of greatly reducing capacity.

CITATION LIST

Patent Literature

Patent Document 1: Japanese Patent No. 3427577B
Patent Document 2: Japanese Patent No. 3565994B
Patent Document 3: Japanese Unexamined Patent Application Publication No. 2003-323891A

SUMMARY OF INVENTION

Technical Problem

An object of the present invention is to provide a carbonaceous material for a non-aqueous electrolyte secondary battery anode and a non-aqueous electrolyte secondary battery anode having high discharge capacity per unit volume and excellent storage characteristics, and a non-aqueous electrolyte secondary battery and a vehicle comprising this non-aqueous electrolyte secondary battery anode.

Solution to Problem

The present inventors discovered that, in a carbonaceous material of which the true density ($\rho_{Bt}$) determined by the pycnometer method using butanol is not less than 1.55 g/cm$^3$ and less than 1.75 g/cm$^3$, when the slope 0.9/X (Vg/Ah) of the discharge curve calculated from the discharge capacity X (Ah/g) and the potential difference of 0.9 (V) corresponding to 0.2 V to 1.1 V in terms of a lithium reference electrode standard is small, hygroscopicity is low despite discharge capacity being high, and as a result, a carbonaceous material having excellent storage characteristics is provided. They achieved the present invention based on this finding. Specifically, the present invention provides the following.

(1) A carbonaceous material for a non-aqueous electrolyte secondary battery anode of which a true density ($\rho_{Bt}$) determined by a pycnometer method using butanol is not less than 1.55 g/cm$^3$ and less than 1.75 g/cm$^3$ and a discharge capacity of an anode at 0.05 V to 1.5 V in terms of a lithium reference electrode standard is not less than 180 mAh/g, a slope 0.9/X (Vg/Ah) of a discharge curve calculated from a discharge capacity X (Ah/g) and a potential difference of 0.9 (V) corresponding to 0.2 V to 1.1 V being not greater than 0.75 (Vg/Ah), and an absorbed moisture quantity after storage for 100 hours in a 25° C. 50% RH air atmosphere being not greater than 1.5 wt %.

(2) The carbonaceous material for a non-aqueous electrolyte secondary battery anode according to the above (1), wherein a true density ($\rho_{He}$) determined by a helium replacement method is not less than 1.76 g/cm$^3$.

(3) The carbonaceous material for a non-aqueous electrolyte secondary battery anode according to the above (1) or (2), wherein a ratio ($\rho_{He}/\rho_{Bt}$) of $\rho_{He}$ and $\rho_{Bt}$ is not less than 1.10.

(4) The carbonaceous material for a non-aqueous electrolyte secondary battery anode according to any one of the above (1) to (3), wherein a specific surface area ratio (BET/CALC) of a specific surface area (BET) (unit: m$^2$/g) determined by a BET method by nitrogen gas adsorption and a specific surface area (CALC) (unit: m$^2$/g) obtained by a formula 6/($D_{v50} \times \rho_{Bt}$) when an average particle size (unit: μm) is taken as $D_{v50}$ is greater than 5.5.

(5) The carbonaceous material for a non-aqueous electrolyte secondary battery anode according to any one of the above (1) to (4), wherein the average particle size is from 1 μm to 15 μm.

(6) A non-aqueous electrolyte secondary battery anode comprising the carbonaceous material for a non-aqueous electrolyte secondary battery anode described in any one of the above (1) to (5).

(7) A non-aqueous electrolyte secondary battery comprising the non-aqueous electrolyte secondary battery anode described in the above (6).

(8) A vehicle in which the non-aqueous electrolyte secondary battery described in the above (7) is mounted.

Advantageous Effects of Invention

According to the present invention, in a carbonaceous material of which the true density ($\rho_{Bt}$) determined by the pycnometer method using butanol is not less than 1.55 g/cm³ and less than 1.75 g/cm³, due to the slope 0.9/X (Vg/Ah) of the discharge curve calculated from the discharge capacity X (Ah/g) and the potential difference of 0.9 (V) corresponding to a potential from 0.2 V to 1.1 V in terms of a lithium reference electrode standard being low, the hygroscopicity is low despite the discharge capacity being high, and as a result, a carbonaceous material having excellent storage characteristics is provided.

DESCRIPTION OF EMBODIMENTS

Hereinafter, embodiments of the present invention will be described.

[1] Carbonaceous Material for Non-Aqueous Electrolyte Secondary Battery Anodes

The carbonaceous material for a non-aqueous electrolyte secondary battery anode of the present invention is characterized in that a true density ($\rho_{Bt}$) determined by a pycnometer method using butanol is not less than 1.55 g/cm³ and less than 1.75 g/cm³ and a discharge capacity of an anode at 0.05 V to 1.5 V in terms of a lithium reference electrode standard is not less than 180 mAh/g, and a slope 0.9/X (Vg/Ah) of a discharge curve calculated from a discharge capacity X (Ah/g) and a potential difference of 0.9 (V) corresponding to 0.2 V to 1.1 V in terms of the lithium reference electrode standard is not greater than 0.75 (Vg/Ah), and an absorbed moisture quantity after storage for 100 hours in a 25° C. 50% RH air atmosphere is not greater than 1.5 wt %.

In a carbonaceous material having high density, namely having a true density ($\rho_{Bt}$) determined by the pycnometer method using butanol of not less than 1.55 g/cm³ and less than 1.75 g/cm³, and having a discharge capacity of the anode at 0.05 V to 1.5 V in terms of a lithium reference electrode standard of not less than 180 mAh/g, when the slope 0.9/X (Vg/Ah) of a discharge curve calculated from the discharge capacity X (Ah/g) and a potential difference of 0.9 V corresponding to 0.2 V to 1.1 V in terms of the lithium reference electrode standard is not greater than 0.75 (Vg/Ah), the slope of the discharge curve per unit volume is gentle in the most useful range of potential in a vehicular lithium-ion secondary battery, namely from 0.2 V to 1.1 V in terms of the lithium reference electrode standard. As a result, the potential difference between the anode and the cathode is maintained at a high level in a state when used in a charged region of about 50%, and high discharge capacity per unit volume can be exhibited. The discharge capacity per unit volume is calculated by the product of the discharge capacity per unit mass and the true density ($\rho_{Bt}$) determined by the pycnometer method using butanol.

Non-aqueous electrolyte secondary batteries for automobiles are preferably used in situations where they are repeatedly charged and discharged such that the battery state is in a range where there is a constant balance between input characteristics and output characteristics, namely the charge region around 50% when fully charged is taken as 100%, rather than usage situations in which they are repeatedly fully charged and then completely discharged. In such a usage situation, it is preferred that the battery has an anode material of which the change in potential ΔE (V) relative to discharge capacity X (Ah/g) changes greatly with a constant slope.

A smaller slope 0.9/X (Vg/Ah) of the discharge curve calculated from the discharge capacity X (Ah/g) and the potential difference of 0.9 (V) corresponding to 0.2 V to 1.1 V in terms of a lithium reference electrode standard provides a higher discharge capacity per unit volume in the slope region where the potential changes. Therefore, the slope is preferably not greater than 0.75 (Vg/Ah), more preferably not greater than 0.70 (Vg/Ah), or not greater than 0.65 (Vg/Ah).

Since $\rho_{Bt}$ is related to the amount of pores through which butanol can penetrate, it is preferably not less than 1.55 g/cm³, more preferably not less than 1.59 g/cm³, or not less than 1.61 g/cm³, from the perspective of striking a balance between improvement of discharge capacity per unit volume versus an increase in the amount of fine pores, an excessive increase in hygroscopicity, and a loss of storage stability. On the other hand, because increased true density tends to result in a material with high crystal structure regularity, $\rho_{Bt}$ is preferably not greater than 1.70 g/cm³ and more preferably not greater than 1.68 g/cm³, from the perspective of inhibiting expansion and contraction associated with charging and discharging.

With the carbonaceous material of the present invention, the slope 0.9/X (Vg/Ah) of the discharge curve calculated from the discharge capacity X (Ah) and the potential difference of 0.9 (V) corresponding to 0.2 V to 1.1 V in terms of a lithium reference electrode standard is small and potential changes gently, and therefore, an anode discharge capacity in the region of practical use from 0.05 V to 1.5 V in terms of the lithium reference electrode standard can be obtained in a high range. Specifically, the anode discharge capacity at 0.05 V to 1.5 V in terms of a lithium reference electrode standard is preferably not less than 180 mAh/g. More preferably, it is not less than 190 mAh/g, or not less than 195 mAh/g.

The absorbed moisture quantity after storage for 100 hours in a 25° C. 50% RH air atmosphere is preferably not greater than 1.5 wt %, more preferably not greater than 1.3 wt %, not greater than 1.0 wt %, not greater than 0.80 wt %, not greater than 0.50 wt %, or not greater than 0.30 wt %.

In the present invention, from the perspective of improving discharge capacity per unit volume, the true density ($\rho_{He}$) determined by the helium replacement method is preferably not less than 1.76 g/cm³ and more preferably not less than 1.85 g/cm³, and from the perspective of limiting hygroscopicity, it is preferably not greater than 2.09 g/cm³ and more preferably not greater than 2.03 g/cm³. While $\rho_{He}$ depends on the quantity of large pores through which helium can penetrate, such pores are not only relatively large pores highly involved in moisture absorption, but also encompass fine pores thought to have a high degree of involvement in Li doping and release. For this reason, $\rho_{He}$ affects both discharge capacity per unit volume and hygroscopicity.

In the present invention, the ratio ($\rho_{He}/\rho_{Bt}$) of $\rho_{He}$ and $\rho_{Bt}$ is preferably not less than 1.10, and on the other hand, preferably not greater than 1.37 and more preferably not greater than 1.28, from the perspective that hygroscopicity tends to become excessively high and storage stability tends to be lost. This ratio reflects the quantity of fine pores through which butanol cannot penetrate but helium can, and such pores are thought to be highly involved in Li doping and release more than being involved in absorption of ambient moisture.

In the present invention, the specific surface area ratio (BET/CALC) of the specific surface area (BET) determined by the BET method by adsorbing nitrogen gas and the specific surface area (CALC) obtained by the formula $6/(D_{v50} \times \rho_{Bt})$ when the average particle size (unit: μm) is taken as $D_{v50}$ is preferably greater than 5.5. BET is determined in broad consideration of pores through which nitrogen gas can penetrate, while on the other hand, CALC depends on $\rho_{Bt}$, and therefore depends on relatively large pores through which butanol can penetrate. That is, the fact that BET/CALC is large reflects a high number of fine pores through which butanol cannot penetrate but helium can, and such pores are thought to be highly involved in Li doping and release more than being involved in absorption of ambient moisture. From this perspective, BET/CALC is preferably not less than 8 and more preferably not less than 11, while on the other hand, it is preferably not greater than 50 and more preferably not greater than 15.

When the specific surface area (BET) determined by the BET method of nitrogen adsorption of the carbonaceous material of the present invention is too low, the discharge capacity of the battery tends to be low, and therefore it is not less than 1 m²/g, preferably not less than 1.6 m²/g, and more preferably not less than 2.0 m²/g. On the other hand, when the BET specific surface area is too high, the irreversible capacity of the obtained battery tends to be high, and therefore it is preferably not greater than 25 m²/g. More preferably, it is not greater than 20 m²/g.

The specific surface area (CALC) determined from the formula $6/(D_{v50} \times \rho_{Bt})$ should be not less than 0.2 m²/g and not greater than 1.5 m²/g. When less than 0.2 m²/g, the discharge capacity of the battery tends to be low, and when greater than 1.5 m²/g, the obtained hygroscopicity tends to be high.

The H/C ratio of the carbonaceous material of the present invention was determined by measuring hydrogen atoms and carbon atoms by elemental analysis. Since the hydrogen content of the carbonaceous material decreases as the degree of carbonization increases, the H/C ratio tends to decrease. Therefore, the H/C ratio is effective as an index expressing the degree of carbonization. Although the H/C ratio of the carbonaceous material of the present invention is not limited, the H/C ratio is not greater than 0.10 and more preferably not greater than 0.08. The H/C ratio is particularly preferably 0.05 or less. When the H/C ratio of hydrogen atoms to carbon atoms exceeds 0.1, the amount of functional groups present in the carbonaceous material increases, and the irreversible capacity can increase due to a reaction with lithium. Therefore, this is not preferable.

The average interlayer spacing of the (002) plane of a carbonaceous material indicates a value that decreases as the crystal integrity increases. The spacing of an ideal graphite structure yields a value of 0.3354 nm, and the value tends to increase as the structure is disordered. Therefore, the average interlayer spacing is effective as an index indicating the carbon structure. The average interlayer spacing of the (002) plane determined by X-ray diffraction using the carbonaceous material for a non-aqueous electrolyte secondary battery anode of the present invention is not less than 0.365 nm, and more preferably not less than 0.370 nm. Similarly, the average interlayer spacing described above is 0.400 nm or less, preferably 0.395 nm or less, and more preferably 0.390 nm or less. If the interlayer spacing of (002) plane is less than 0.365 nm, when the carbonaceous material is used as a non-aqueous electrolyte secondary battery anode, doping capacity will be small, which is not preferable. Furthermore, if the interlayer spacing of (002) plane exceeds 0.400 nm, irreversible capacity will be large, which is not preferable.

To improve output energy characteristics, it is important that the active material layer of the electrode be thin, and for this reason, it is important that the average particle size be small. However, if the average particle size is too small, the amount of fine powder will increase and safety will decrease, which is not preferable. Furthermore, when the particles are too small, the amount of binder required to make them into an electrode becomes large, and the resistance of the electrode increases. On the other hand, when the average particle size is large, coating the electrode thinly becomes difficult, and additionally, the diffusion free path of lithium within the particles increases, which makes rapid charging and discharging difficult. For this reason, the average particle size $D_{v50}$ (particle size at which cumulative volume is 50%) is preferably from 1 to 15 μm, more preferably not less than 1.5 μm, or not less than 2 μm, and not greater than 13 μm, or not greater than 12 μm.

The carbonaceous material for a non-aqueous electrolyte secondary battery anode of the present invention is not particularly limited, but may be satisfactorily manufactured by optimizing the heat treatment conditions while using a manufacturing method similar to that of conventional carbonaceous materials for non-aqueous electrolyte secondary battery anodes as a basis. Specifically, the manufacturing method is as follows.

Carbon Precursor

The carbonaceous material of the present invention is produced from a carbon precursor. Examples of carbon precursors include petroleum pitch or tar, coal pitch or tar, thermoplastic resins, and thermosetting resins. In addition, examples of thermoplastic resins include polyacetals, polyacrylonitriles, styrene/divinylbenzene copolymers, polyimides, polycarbonates, modified polyphenylene ethers, polybutylene terephthalates, polyarylates, polysulfones, polyphenylene sulfides, fluorine resins, polyamide imides, and polyether ether ketones. Furthermore, examples of thermosetting resins include phenol resins, amino resins, unsaturated polyester resins, diallyl phthalate resins, alkyd resins, epoxy resins, and urethane resins.

In this specification, a "carbon precursor" refers to a carbon material from the stage of an untreated carbon material to the preliminary stage of the carbonaceous material for a non-aqueous electrolyte secondary battery anode that is ultimately obtained. That is, a "carbon precursor" refers to all carbon materials for which the final step has not been completed.

In addition, in this specification, a "heat-infusible carbon precursor" refers to a resin that does not melt due to pre-heat treatment or final heat treatment. That is, in the case of petroleum pitch or tar, coal pitch or tar, or a thermoplastic resin, this refers to a carbonaceous precursor subjected to the infusibilization treatment described below. On the other hand, since thermosetting resins are pre-fired as-is or do not melt even when final heat treatment is performed, infusibilization treatment is unnecessary.

Since the carbonaceous material of the present invention is a non-graphitizable carbonaceous material, a petroleum pitch or tar, coal pitch or tar, or thermoplastic resin must be subjected to infusibilization treatment in order to make the material heat-infusible in the production process. Infusibilization treatment can be performed by forming a crosslink in the carbon precursor by oxidation. That is, infusibilization treatment can be performed by a publicly known method in the field of the present invention. For example, it can be performed in accordance with the infusibilization (oxidation) procedure described below.

Infusibilization Step

Infusibilization treatment is performed when a petroleum pitch or tar, coal pitch or tar, or thermoplastic resin is used as a carbon precursor. The method used for infusibilization treatment is not particularly limited, but infusibilization treatment may be performed using an oxidizer, for example. The oxidizer is also not particularly limited, but an oxidizing gas such as $O_2$, $O_3$, $SO_3$, $NO_2$, a mixed gas in which these are diluted with air, nitrogen, or the like, or air may be used as a gas. In addition, an oxidizing liquid such as sulfuric acid, nitric acid, or hydrogen peroxide or a mixture thereof can be used as a liquid. The oxidation temperature is also not particularly limited but is preferably from 120 to 400° C. and more preferably from 150 to 350° C. When the temperature is lower than 120° C., a crosslinked structure cannot be formed sufficiently, and particles fuse to one another in the heat treatment step. When the temperature is higher than 400° C., decomposition reactions become more prominent than crosslinking reactions, and the yield of the resulting carbon material becomes low.

Heat treatment is the process of transforming a non-graphitizable carbon precursor into a carbonaceous material for a non-aqueous electrolyte secondary battery anode. When performing pre-heat treatment and final heat treatment, the carbon precursor may be pulverized and subjected to final heat treatment after the temperature is reduced after pre-heat treatment. The pulverization step may be performed after the infusibilization step but is preferably performed after pre-heat treatment.

The carbonaceous material of the present invention is manufactured by a step of pulverizing a carbon precursor and a step of heating the carbon precursor.

Pre-Heat Treatment Step

The pre-heat treatment step in the present invention is performed by heating a carbon source at not lower than 300° C. and lower than 900° C. Pre-heat treatment removes volatile matter such as $CO_2$, $CO$, $CH_4$, and $H_2$, for example, and the tar content so that the generation of these components can be reduced and the burden of the heat treatment vessel can be reduced in final heat treatment. When the pre-heat treatment temperature is lower than 300° C., de-tarring becomes insufficient, and the amount of tar or gas generated in the final heat treatment step after milling becomes large. This may adhere to the particle surface and cause a decrease in battery performance without being able to maintain the surface properties after milling, which is not preferable. The pre-heat treatment temperature is preferably not lower than 300° C., more preferably not lower than 500° C., and particularly preferably not lower than 600° C. On the other hand, when the pre-heat treatment temperature is not lower than 900° C., the temperature exceeds the tar-generating temperature range, and the used energy efficiency decreases, which is not preferable. Furthermore, the generated tar causes a secondary decomposition reaction, and the tar adheres to the carbon precursor and causes a decrease in performance, which is not preferable. When the pre-heat treatment temperature is too high, carbonization progresses and the particles of the carbon precursor become too hard. As a result, when pulverization is performed after pre-heat treatment, pulverization may be difficult due to the chipping away of the interior of the pulverizer, which is not preferable.

The pre-heat treatment is performed in an inert gas atmosphere, and examples of the inert gas include nitrogen, argon, and the like. In addition, pre-heat treatment can be performed under reduced pressure at a pressure of 10 kPa or lower, for example. The pre-heat treatment time is not particularly limited, but pre-heat treatment may be performed for 0.5 to 10 hours, for example, and is preferably performed for 1 to 5 hours.

To obtain the carbonaceous material of the present invention, the heating rate is preferably not less than 1° C./h and not greater than 150° C./h, more preferably not less than 5° C./h and not greater than 100° C./h, and even more preferably not less than 10° C./h and not greater than 50° C./h. This is thought to be because a carbonaceous material of which the true density ($\rho_{Bt}$) determined by the pycnometer method using butanol is not less than 1.55 g/cm$^3$ and less than 1.75 g/cm$^3$ produces a large amount of tar during pre-heat treatment, and by gradually volatilizing these volatile components, a carbonaceous material having an advantageous pore size can be prepared and high discharge capacity can be realized. However, the present invention is not limited by the above description.

Pulverization Step

The pulverization step is performed in order to make the particle size of the carbon precursor uniform. Pulverization can be performed after carbonization by final heat treatment. When the carbonization reaction progresses, the carbon precursor becomes hard and the particle size distribution is difficult to control by means of pulverization, and therefore the pulverization step is preferably performed after pre-heat treatment and prior to final heat treatment.

The mill used is not particularly limited, and a jet mill, a ball mill, a hammer mill, a rod mill, or the like, for example, can be used, but a jet mill equipped with a classification function is preferable from the perspective that there is minimal fine powder generation. On the other hand, when a ball mill, a hammer mill, a rod mill, or the like is used, fine powder can be removed by performing classification after milling.

Examples of classification include classification with a sieve, wet classification, and dry classification. An example of a wet classifier is a classifier utilizing a principle such as gravitational classification, inertial classification, hydraulic classification, or centrifugal classification. An example of a dry classifier is a classifier utilizing a principle such as sedimentation classification, mechanical classification, or centrifugal classification.

In the milling step, milling and classification can be performed with a single apparatus. For example, milling and classification can be performed using a jet mill equipped with a dry classification function.

Furthermore, an apparatus with an independent miller and classifier can also be used. In this case, milling and classification can be performed continuously, but milling and classification may also be performed non-continuously.

Final Heat Treatment Step

The final heat treatment step in the present invention can be performed in accordance with an ordinary final heat treatment procedure, and a carbonaceous material for a non-aqueous electrolyte secondary battery anode can be obtained by performing final heat treatment. The final heat treatment temperature is from 900 to 1600° C. If the heat treatment temperature is lower than 900° C., a large amount of functional groups remain in the carbonaceous material, the value of H/C increases, and the irreversible capacity also increases due to a reaction with lithium. Therefore, it is not preferable. The lower limit of the heat treatment temperature in the present invention is not lower than 900° C., more preferably not lower than 1000° C., and particularly preferably not lower than 1100° C. On the other hand, when the final heat treatment temperature exceeds 1600° C., the selective orientation of the carbon hexagonal plane increases, and the discharge capacity decreases, which is not preferable. The upper limit of the final heat treatment temperature in the present invention is 1600° C. or lower, more preferably 1500° C. or lower, and particularly preferably 1450° C. or lower.

Final heat treatment is preferably performed in a non-oxidizing gas atmosphere.

Examples of non-oxidizing gases include helium, nitrogen, and argon, and the like, and these may be used alone or as a mixture. Final heat treatment may also be performed in a gas atmosphere in which a halogen gas such as chlorine is mixed with the non-oxidizing gas described above. In addition, final heat treatment can be performed under reduced pressure at a pressure of 10 kPa or lower, for example. The final heat treatment time is not particularly limited, but final heat treatment can be performed for 0.1 to 10 hours, for example, and is preferably performed for 0.2 to 8 hours, and more preferably for 0.4 to 6 hours.

Production of Carbonaceous Material from Tar or Pitch

Examples of the production method for the carbonaceous material of the present invention from tar or pitch will be described below.

First, crosslinking treatment (infusibilization) was performed on tar or pitch. The tar or pitch that has undergone crosslinking treatment is carbonized by subsequent heat treatment, to result in a non-graphitizable carbonaceous material. Examples of tar or pitch that can be used include petroleum or coal tar or pitch such as petroleum tar or pitch produced as a by-product at the time of ethylene production, coal tar produced at the time of coal carbonization, heavy components or pitch from which the low-boiling-point components of coal tar are distilled out, or tar or pitch obtained by coal liquefaction. Two or more of these types of tar and pitch may also be mixed together.

Specific methods of infusibilization include a method of using a crosslinking agent or a method of treating the material with an oxidizer such as air. When a crosslinking agent is used, a carbon precursor is obtained by adding a crosslinking agent to the petroleum tar or pitch or coal tar or pitch and mixing the substances while heating so as to promote crosslinking reactions. For example, a polyfunctional vinyl monomer with which crosslinking reactions are promoted by radical reactions such as divinylbenzene, trivinylbenzene, diallyl phthalate, ethylene glycol dimethacrylate, or N,N-methylene bis-acrylamide may be used as a crosslinking agent. Crosslinking reactions with the polyfunctional vinyl monomer are initiated by adding a radical initiator. Here, $\alpha,\alpha'$-azobis-isobutyronitrile (AIBN), benzoyl peroxide (BPO), lauroyl peroxide, cumene hydroperoxide, 1-butyl hydroperoxide, hydrogen peroxide, or the like can be used as a radical initiator.

In addition, when promoting crosslinking reactions by treating the material with an oxidizer such as air, it is preferable to obtain the carbon precursor with the following method. Specifically, after a 2- or 3-ring aromatic compound with a boiling point of at least 200° C. or a mixture thereof is added to a petroleum pitch or coal pitch as an additive and mixed while stirring, the mixture is molded to obtain a pitch compact. Next, after the additive is extracted from the pitch compact with a solvent having low solubility with respect to the pitch and having high solubility with respect to the additive so as to form a porous pitch, the mixture is oxidized using an oxidizer to obtain a carbon precursor. The purpose of the aromatic additive described above is to make the compact porous by extracting the additive from the pitch compact after molding so as to facilitate crosslinking treatment by means of oxidation and to make the carbonaceous material obtained after carbonization porous. The additive described above may be selected, for example, from one type of naphthalene, methyl naphthalene, phenyl naphthalene, benzyl naphthalene, methyl anthracene, phenanthrene, or biphenyl or a mixture of two or more types thereof. The amount of the aromatic additive added to the pitch is preferably in a range of 30 to 70 parts by mass per 100 parts by mass of the pitch.

To achieve a homogeneous mixture of the pitch and the additive, they are mixed in the molten state while heating. This is preferably performed after the mixture of the pitch and the additive is molded into particles with a particle size of at most 1 mm so that the additive can be easily extracted from the mixture. Molding may be performed in the melted state and may be performed with a method such as cooling and then pulverizing the mixture. Suitable examples of solvents for extracting and removing the additive from the mixture of the pitch and the additive include aliphatic hydrocarbons such as butane, pentane, hexane, or heptane, mixtures of aliphatic hydrocarbon primary constituents such as naphtha or kerosene, and aliphatic alcohols such as methanol, ethanol, propanol, or butanol. By extracting the additive from the compact of the mixture of pitch and additive using such a solvent, the additive can be removed from the compact while the spherical shape of the compact is maintained. It is surmised that holes are formed by the additive in the compact at this time, and a pitch compact having uniform porosity can be obtained.

Furthermore, as a method for preparing a porous pitch compact other than the above method, the following method may be used. Petroleum pitch or coal pitch or the like is pulverized to an average particle size (median diameter) of not greater than 60 μm, and then the fine powdered pitch, preferably fine powdered pitch having an average particle size (median diameter) of not less than 5 μm and not greater than 40 μm, is compression molded to form a porous compression molded compact. For compression molding, an existing molding machine may be used, specific examples of which include a single-action vertical molder, a continuous rotary molder, and a roll compression molder, but it is not limited thereto. The pressure during compression molding is preferably surface pressure of 20 to 100 MPa or linear pressure of 0.1 to 6 MN/m, and more preferably surface pressure of 23 to 86 MPa or linear pressure of 0.2 to 3 MN/m. The holding time of pressure during compression molding may be determined as appropriate according to the type of molding machine and the properties and treated quantity of the fine powdered pitch, but is generally in the range of 0.1 sec to 1 min. A binder may be compounded as necessary while compression molding the fine powdered pitch. Specific examples of the binder include water, starch, methylcellulose, polyethylene, polyvinyl alcohol, polyurethane, phenol resin, and the like, but the binder is not necessarily limited thereto. The shape of the porous pitch compact obtained by compression molding may be particles, round cylinders, spheres, pellets, plates, honeycombs, blocks, Raschig rings, and the like, without particular limitation.

In order to crosslink the obtained porous pitch, it is then preferably oxidized using an oxidizer at a temperature of 120 to 400° C. Here, an oxidizing gas such as $O_2$, $O_3$, $NO_2$, a mixed gas in which these are diluted with air, nitrogen, or the like, or air, or an oxidizing liquid such as sulfuric acid, nitric acid, or hydrogen peroxide water can be used as an oxidizer. It is convenient and economically advantageous to perform crosslinking treatment by oxidizing the material at 120 to 400° C. using a gas containing oxygen such as air or a mixed gas of air and another gas such as a combustible gas, for example, as an oxidizer. In this case, when the softening point of the pitch is low, the pitch melts at the time of oxidation, which makes oxidation difficult, so the pitch that is used preferably has a softening point of at least 150° C. After the carbon precursor subjected to crosslinking treatment as described above is subjected to pre-heat treatment, the carbonaceous material of the present invention can be obtained by carbonizing the carbon precursor at 900° C. to 1600° C. in a non-oxidizing gas atmosphere.

Production of Carbonaceous Material from Resin

Examples of the production method for the carbonaceous material from a resin will be described below.

The carbonaceous material of the present invention can also be obtained by carbonizing the material at 900° C. to 1600° C. using a resin as a precursor. Phenol resins, furan resins, or thermosetting resins in which the functional groups of these resins are partially modified may be used as resins. The carbonaceous material can also be obtained by subjecting a thermosetting resin to pre-heat treatment at a temperature of lower than 900° C. as necessary and then pulverizing and carbonizing the resin at 900° C. to 1600° C. Oxidation treatment (infusibilization treatment) may also be performed as necessary at a temperature of 120 to 400° C. for the purpose of accelerating the curing of the thermosetting resin, accelerating the degree of crosslinkage, or improving the carbonization yield. Here, an oxidizing gas such as $O_2$, $O_3$, $NO_2$, a mixed gas in which these are diluted with air, nitrogen, or the like, or air, or an oxidizing liquid such as sulfuric acid, nitric acid, or hydrogen peroxide water can be used as an oxidizer. Furthermore, it is also possible to use a carbon precursor prepared by infusibilizing a thermoplastic resin such as polyacrylonitrile or a styrene/divinyl benzene copolymer. These resins can be obtained, for example, by adding a monomer mixture prepared by mixing a radical polymerizable vinyl monomer and a polymerization initiator to an aqueous dispersion medium containing a dispersion stabilizer, suspending the mixture by mixing while stirring to transform the monomer mixture to fine liquid droplets, and then heating the droplets to promote radical polymerization. The resulting crosslinked structure of the resin can be developed by means of infusibilization treatment (oxidation treatment) to form a spherical carbon precursor. Infusibilization treatment can be performed in a temperature range of 120 to 400° C., particularly preferably in a range of 170 to 350° C., and even more preferably in a range of 220 to 350° C. Here, an oxidizing gas such as $O_2$, $O_3$, $SO_3$, $NO_2$, a mixed gas in which these are diluted with air, nitrogen, or the like, or air, or an oxidizing liquid such as sulfuric acid, nitric acid, or hydrogen peroxide water can be used as an oxidizer. The carbonaceous material of the present invention can be obtained by then subjecting the heat-infusible carbon precursor to pre-heat treatment as necessary, as described above and then pulverizing and carbonizing the carbon precursor at 900° C. to 1600° C. in a non-oxidizing gas atmosphere.

The pulverization step may also be performed after carbonization, but when the carbonization reaction progresses, the carbon precursor becomes hard, which makes it difficult to control the particle size distribution by means of pulverization, so the pulverization step is preferably performed after pre-heat treatment at a temperature of lower than 900° C. and prior to final heat treatment.

[2] Non-Aqueous Electrolyte Secondary Battery Anode

The non-aqueous electrolyte secondary battery anode of the present invention comprises the carbonaceous material for a non-aqueous electrolyte secondary battery anode of the present invention.

Production of Anode

The anode that uses the carbonaceous material of the present invention can be produced by adding a binder to the carbonaceous material, adding appropriate amount of suitable solvent, kneading to form an electrode mixture, subsequently, coating the electrode mixture on a collector formed from a metal plate or the like and drying, and then pressure-forming. An electrode having high conductivity can be produced by using the carbonaceous material of the present invention without particularly adding a conductivity agent, but a conductivity agent may be added as necessary when preparing the electrode mixture for the purpose of imparting even higher conductivity. As the conductivity agent, conductive carbon black, vapor-grown carbon fibers (VGCF), nanotubes, or the like can be used. The added amount of the conductivity agent differs depending on the type of the conductivity agent that is used, but when the added amount is too small, the expected conductivity cannot be achieved, which is not preferable. Conversely, when the added amount is too large, dispersion of the conductivity agent in the electrode mixture becomes poor, which is not preferable. From this perspective, the proportion of the added amount of the conductivity agent is preferably from 0.5 to 10 mass % (here, it is assumed that the amount of the active material (carbonaceous material)+the amount of the binder+the amount of the conductivity agent=100 mass %), more preferably from 0.5 to 7 mass %, and particularly preferably from 0.5 to 5 mass %. The binder is not particularly limited as long as the binder does not react with an electrolyte solution such as polyvinylidene fluoride (PVDF), polytetrafluoroethylene, and a mixture of styrene-butadiene rubber (SBR) and carboxymethyl cellulose (CMC). Of these, PVDF is preferable since the PVDF attached on the surface of an active material does not inhibit migration of lithium-ions and excellent input/output characteristics is achieved. In order to form a slurry by dissolving PVDF, a polar solvent such as N-methylpyrrolidone (NMP) can be preferably used; however, aqueous emulsion, such as SBR, or CMC can be also used by dissolving in water. When the added amount of the binder is too large, since the resistance of the resulting electrode becomes large, the internal resistance of the battery becomes large. This diminishes the battery characteristics, which is not preferable. When the added amount of the binder is too small, the bonds between the anode material particles, and the bonds between the anode material particles and the current collector become insufficient, which is not preferable. Preferable amount of the binder that is added differs depending on the type of the binder that is used; however, the amount of binder is, when a PVDF-based binder is used, preferably from 3 to 13 mass %, and more preferably from 3 to 10 mass %. On the other hand, when using a binder that uses water as a solvent, a plurality of binders is often mixed for use (e.g. a mixture of SBR and CMC). The total amount of all the binders that are used is preferably from 0.5 to 5 mass %, and more preferably from 1 to 4 mass %. The electrode active material layer is typically formed on both sides of the current collector, but the layer may be formed on one side as necessary. The number of required current collectors or separators becomes smaller as the thickness of the electrode active material layer increases, which is preferable for increasing capacity. However, it is more advantageous from the perspective of improving the input/output characteristics for the electrode area of opposite electrodes to be wider, so when the active material layer is too thick, the input/output characteristics are diminished, which is not preferable. The thickness of the active material layer (on each side) is from 10 to 80 µm, more preferably from 20 to 75 µm, and even more preferably from 20 to 60 µm.

[3] Non-Aqueous Electrolyte Secondary Battery

The non-aqueous electrolyte secondary battery of the present invention comprises the non-aqueous electrolyte secondary battery anode of the present invention.

Production of Non-Aqueous Electrolyte Secondary Battery

When an anode for a non-aqueous electrolyte secondary battery is formed using the anode material of the present invention, the other materials constituting the battery such as a cathode material, a separator, and an electrolyte solution are not particularly limited, and various materials that have been conventionally used or proposed for non-aqueous solvent secondary batteries can be used.

For example, layered oxide-based (as represented by $LiMO_2$, where M is a metal such as $LiCoO_2$, $LiNiO_2$, $LiMnO_2$, or $LiNi_xCo_yMo_zO_2$ (where x, y, and z represent composition ratios)), olivine-based (as represented by $LiMPO_4$, where M is a metal, such as $LiFePO_4$), and spinel-based (as represented by $LiM_2O_4$, where M is a metal, such as $LiMn_2O_4$) complex metal chalcogen compounds are preferable as cathode materials, and these chalcogen compounds may be mixed as necessary. A cathode is formed by coating these cathode materials with an appropriate binder together with a carbon material for imparting conductivity to the electrode and forming a layer on a conductive current collector.

A non-aqueous electrolyte solution used with this cathode and anode combination is typically formed by dissolving an electrolyte in a non-aqueous solvent. As the non-aqueous solvent, for example, one type or a combination of two or more types of organic solvents, such as propylene carbonate, ethylene carbonate, dimethyl carbonate, diethyl carbonate, dimethoxy ethane, diethoxy ethane, γ-butyl lactone, tetrahydrofuran, 2-methyltetrahydrofuran, sulfolane, or 1,3-dioxolane. Furthermore, $LiClO_4$, $LiPF_6$, $LiBF_4$, $LiCF_3SO_3$, $LiAsF_6$, LiCl, LiBr, $LiB(C_6H_5)_4$, $LiN(SO_3CF_3)_2$ and the like can be used as an electrolyte. Secondary battery is typically formed by immersing, in an electrolyte solution, a cathode layer and an anode layer, which are produced as described above, that are arranged facing each other via, as necessary, a liquid permeable separator formed from nonwoven fabric and other porous materials. As a separator, a liquid permeable separator formed from nonwoven fabric and other porous materials that is typically used in secondary batteries can be used. Alternatively, in place of a separator or together with a separator, a solid electrolyte formed from polymer gel in which an electrolyte solution is impregnated can be also used.

The lithium-ion secondary battery of the present invention is suitable for a battery that is mounted on vehicles such as automobiles (typically, lithium-ion secondary battery for driving vehicle).

"Vehicle" in the present invention can be, without any particular limitations, a vehicle known as a typical electric vehicle, a hybrid vehicle of a fuel cell and an internal-combustion engine, or the like; however, the vehicle in the present invention is a vehicle that comprises at least: a power source device provided with the battery described above, a motor driving mechanism driven by the power supply from the power source device, and a control device that controls this. Further, the vehicle may also be equipped with a rheostatic brake or a regenerative brake, and a mechanism for charging the lithium ion secondary battery by converting energy generated by braking into electricity. This battery is useful in a hybrid vehicle particularly because the degree of freedom of battery capacity is low.

EXAMPLES

The present invention will be described in detail hereafter using working examples, but these working examples do not limit the scope of the present invention.

The measurement methods for the physical properties ($\rho_{Bt}$, $\rho_{He}$, BET specific surface area, average particle size ($D_{v50}$), atomic ratio (H/C) of hydrogen and carbon, $d_{002}$, charge capacity, discharge capacity, irreversible capacity, absorbed moisture quantity) of the carbonaceous material for a non-aqueous electrolyte secondary battery anode according to the present invention will be described hereinafter, but the physical properties described in this specification, including those in the working examples, are based on values determined by the following methods.

True Density Determined by Pycnometer Method Using Butanol ($\rho_{Bt}$)

True density was measured using the pycnometer method using butanol in accordance with the method prescribed in JIS R 7212. The mass ($m_1$) of a pycnometer with a bypass line having an internal volume of approximately 40 mL was precisely measured. Next, after a sample was placed flat at the bottom of the pycnometer so as to have a thickness of approximately 10 mm, the mass ($m_2$) was precisely measured. Next, 1-butanol was slowly added to the pycnometer to a depth of approximately 20 mm from the bottom. Next, the pycnometer was gently oscillated, and after it was confirmed that no large air bubbles were formed, the pycnometer was placed in a vacuum desiccator and gradually evacuated to a pressure of 2.0 to 2.7 kPa. The pressure was maintained for 20 minutes or longer, and after the generation of air bubbles stopped, the bottle was removed and further filled with 1-butanol. After a stopper was inserted, the bottle was immersed in a constant-temperature water bath (adjusted to 30±0.03° C.) for at least 15 minutes, and the liquid surface of 1-butanol was aligned with the marked line. Next, the pycnometer was removed, and after the outside of the pycnometer was thoroughly wiped and the pycnometer was cooled to room temperature, the mass ($m_4$) was precisely measured.

Next, the same pycnometer was filled with 1-butanol alone and immersed in a constant-temperature water bath in the same manner as described above. After the marked line was aligned, the mass ($m_3$) was measured. In addition, distilled water which was boiled immediately before use and from which the dissolved gas was removed was collected in the pycnometer and immersed in a constant-temperature water bath in the same manner as described above. After the marked line was aligned, the mass ($m_5$) was measured. $\rho_{Bt}$ is calculated using the following formula.

$$\rho_{Bt} = \frac{m_2 - m_1}{m_2 - m_1 - (m_4 - m_3)} \times \frac{m_3 - m_1}{m_5 - m_1} d \qquad \text{[Formula 1]}$$

Here, d is the specific gravity (0.9946) of water at 30° C.

True Density Determined by Helium Method ($\rho_{He}$)

Measurement of $\rho_{He}$ was performed by using Full-Automatic Gas Displacement Pycnometer AccuPyc II1340, manufactured by Shimadzu Corporation. The sample was measured after drying for 5 hours at 200° C. Using a 10 cm³ cell, 1 g of sample was placed in the cell, and measurement was performed at an ambient temperature of 23° C. The number of purges was 10 times, and an average value obtained by averaging five samples (n=5), when it was confirmed that volume values obtained by repeated measurements were identical within a deviation of 0.5%, was used as $\rho_{He}$.

The measurement device has a sample chamber and an expansion chamber, and the sample chamber has a pressure gauge for measuring the pressure inside the chamber. The sample chamber and the expansion chamber are connected via a connection tube provided with a valve. A helium gas introduction tube having a stop valve is connected to the sample chamber, and a helium gas discharging tube having a stop valve is connected to the expansion chamber.

Specifically, the measurement was performed as described below.

The volume of the sample chamber ($V_{CELL}$) and the volume of the expansion chamber ($V_{EXP}$) are measured in advance using calibration spheres of a known volume. A sample is placed in the sample chamber, and then the system is filled with helium and the pressure in the system at this time is $P_a$. Then, the valve is closed, and helium gas is introduced only to the sample chamber in order to increase the pressure thereof to pressure $P_1$. Then, the valve is opened to connect the expansion chamber and the sample chamber, the pressure within the system decreases to the pressure $P_2$ due to expansion. The volume of the sample ($V_{SAMP}$) at this time is calculated by the following formula.

$$V_{SAMP} = V_{CELL} - [V_{EXP}/\{(P_1-P_a)/(P_2-P_a)-1\}]$$ [Formula 2]

Therefore, when the mass of the sample is $W_{SAMP}$, the density can be obtained as described below.

$$\rho_{He} = W_{SAMP}/V_{SAMP}$$ [Formula 3]

Specific Surface Area (BET) by Nitrogen Adsorption

An approximation derived from the BET formula is given below.

$$v_m = \frac{1}{\{v(1-x)\}}$$ [Formula 4]

A value $v_m$ was determined by a one-point method (relative pressure x=0.2) based on nitrogen adsorption at the temperature of liquid nitrogen using the above approximation, and the specific surface area of the sample was calculated from the following formula:

Specific surface area (BET)=4.35×$V_m$(m$^2$/g) [Formula 5]

Here, $v_m$ is the amount of adsorption (cm$^3$/g) required to form a monomolecular layer on the sample surface; v is the amount of adsorption (cm$^3$/g) that is actually measured; and x is the relative pressure.

Specifically, the amount of adsorption of nitrogen in the carbonaceous material at the temperature of liquid nitrogen was measured as follows using a "Flow Sorb II2300" manufactured by MICROMERITICS. A test tube was filled with carbonaceous material pulverized to an average particle size of approximately 1 to 20 μm, and the test tube was cooled to −196° C. while infusing a mixed gas of helium and nitrogen in a ratio of 80:20 so that the nitrogen was adsorbed in the carbonaceous material. Next, the test tube was returned to room temperature. The amount of nitrogen desorbed from the sample at this time was measured with a thermal conductivity detector and used as the adsorption gas amount v.

Hydrogen/Carbon Atomic Ratio (H/C)

The atomic ratio was measured in accordance with the method prescribed in JIS M8819. The ratio of the numbers of hydrogen/carbon atoms was determined from the mass ratio of hydrogen and carbon in a sample obtained by elemental analysis using a CHN analyzer.

Average Interlayer Spacing ($d_{002}$) by X-Ray Diffraction

A sample holder was filled with a carbonaceous material powder, and measurements were performed with a symmetrical reflection method using an X'Pert PRO manufactured by the PANalytical B.V. Under conditions with a scanning range of 8<2θ<50° and an applied current/applied voltage of 45 kV/40 mA, an X-ray diffraction pattern was obtained using CuKα rays (λ=1.5418 Å) monochromated by an Ni filter as a radiation source. The correction was performed by using the diffraction peak of the (111) surface of a high-purity silicon powder serving as a standard substance. The wavelength of the CuKα rays is set to 0.15418 nm, and $d_{002}$ is calculated by Bragg's equation.

$$d_{002} = \frac{\lambda}{2 \cdot \sin\theta} \text{ (Bragg's equation)}$$ [Formula 6]

λ: Wavelength of X-rays; θ: Diffraction angle

Average Particle Size as Determined by Laser Diffraction ($D_{v50}$)

Three drops of a dispersant (cationic surfactant, "SN-WET 366" (manufactured by San Nopco Limited)) were added to approximately 0.01 g of a sample, and the dispersant was blended into the sample. Next, after purified water was added and dispersed using ultrasonic waves, the particle size distribution in a particle size range of from 0.08 to 3000 μm was determined with a particle size distribution measurement device ("SALD-3000S" manufactured by the Shimadzu Corporation) by setting the complex refractive index parameter (real part–imaginary part) to 2.0–0.1i. The average particle size $D_{v50}$ was determined from the resulting particle size distribution as the particle size yielding a cumulative volume of 50%.

Absorbed Moisture Quantity

Before measurement, the carbonaceous material was vacuum-dried for 12 hours at 200° C., and then 1 g of this carbonaceous material was spread on a petri dish measuring 9.5 cm in diameter and 1.5 cm high so as to result in as thin a layer as possible. This was left to stand for 10 hours in a thermo-hygrostatic tank controlled to a constant environment of temperature 25° C. and humidity 50%, and then the container was removed from the thermo-hygrostatic tank, and the absorbed moisture quantity was measured using a Karl Fischer moisture meter (CA-200, manufactured by Mitsubishi Chemical Analytech Co., Ltd.). The temperature of a vaporization chamber (VA-200, manufactured by Mitsubishi Chemical Analytech Co., Ltd.) was set to 200° C.

Doping/De-Doping Test of Active Material

Anodes and non-aqueous electrolyte secondary batteries were produced by performing the following operations (a) to (d) using the carbonaceous materials 1 to 10 obtained in Working Examples 1 to 10 and the comparative carbonaceous materials 1 to 6 obtained in Comparative Examples 1 to 6, and the electrode performance thereof was evaluated.

(a) Production of Electrode

An anode mixture obtained by adding NMP to 94 parts by mass of the above carbonaceous material and 6 parts by mass of polyvinylidene fluoride (KF#9100, manufactured by Kureha Corporation) and forming into a paste, and an anode mixture obtained by adding water to 96 parts by mass of the above carbonaceous material, 3 parts by mass of SBR, and 1 part by mass of CMC and forming into a paste, were produced. The electrode mixtures were spread uniformly on copper foil. After the sample was dried, the sample was punched from the copper foil into a disc shape with a diameter of 15 mm, and pressed to obtain an electrode. The amount of the carbonaceous material in the electrode was adjusted to approximately 10 mg.

(b) Production of Test Battery

Although the carbonaceous material of the present invention is suitable for forming an anode for a non-aqueous electrolyte secondary battery, in order to precisely evaluate the discharge capacity (de-doping capacity) and the irreversible capacity (non-de-doping capacity) of the battery active material without being affected by fluctuation in the performance of the counter electrode, a lithium secondary battery was formed using the electrode obtained above together with a counter electrode comprising lithium metal with stable characteristics, and the characteristics thereof were evaluated.

The lithium electrode was prepared inside a glove box in an Ar atmosphere. An electrode (counter electrode) was formed by spot-welding a stainless steel mesh disc with a diameter of 16 mm on the outer lid of a 2016 coin type test cell in advance, punching a thin sheet of metal lithium with a thickness of 0.8 mm into a disc shape with a diameter of 15 mm, and pressing the thin sheet of metal lithium into the stainless steel mesh disc.

A 2016 coin-type non-aqueous electrolyte lithium secondary battery was assembled in an Ar glove box using a pair of electrodes produced in this way, using a solution in which $LiPF_6$ was added at a proportion of 1.4 mol/L to a mixed solvent prepared by mixing ethylene carbonate, dimethyl carbonate, and methyl ethyl carbonate at a volume ratio of 1:2:2 as an electrolyte solution, using a fine porous membrane separator made of borosilicate glass fibers with a diameter of 19 mm as a separator, and using a polyethylene gasket.

(c) Measurement of Battery Capacity

Charge-discharge tests were performed at 25° C. on a lithium secondary battery with the configuration described above using a charge-discharge tester ("TOSCAT" manufactured by Toyo System Co., Ltd.). A lithium doping reaction for inserting lithium into the carbon electrode was performed with a constant-current/constant-voltage method, and a de-doping reaction was performed with a constant-current method. Here, in a battery using a lithium chalcogen compound for the cathode, the doping reaction for inserting lithium into the carbon electrode is called "charging", and in a battery using lithium metal for a counter electrode, as in the test battery of the present invention, the doping reaction for the carbon electrode is called "discharging". The manner in which the doping reactions for inserting lithium into the same carbon electrode thus differs depending on the pair of electrodes used. Therefore, the doping reaction for inserting lithium into the carbon electrode will be described as "charging" hereafter for the sake of convenience. Conversely, "discharging" refers to a charging reaction in the test battery but is described as "discharging" for the sake of convenience since it is a de-doping reaction for removing lithium from the carbonaceous material. The charging method used here is a constant-current/constant-voltage method. Specifically, constant-current charging was performed at 0.5 mA/cm$^2$ until the terminal voltage reached 0.050 V. After the terminal voltage reached 0.050 V, constant-voltage charging was performed at a terminal voltage of 0.050 V, and charging was continued until the current value reached 20 µA. At this time, a value determined by dividing the amount of electricity supplied by the mass of the carbonaceous material of the electrode is defined as the charge capacity per unit mass of the carbonaceous material (mAh/g). After the completion of charging, the battery circuit was opened for 30 minutes, and discharging was performed thereafter. Discharging was performed at a constant current of 0.5 mA/cm$^2$ until the final voltage reached 1.5 V. At this time, a value determined by dividing the amount of electricity discharged by the mass of the carbonaceous material of the electrode is defined as the discharge capacity per unit mass of the carbonaceous material (mAh/g). The irreversible capacity was calculated as the discharge capacity subtracted from the charge capacity. The charge/discharge capacities and irreversible capacity were determined by averaging three measurements (n=3) for test batteries produced using the same sample. Additionally, the value obtained by dividing the discharge capacity by the charge capacity was multiplied by 100 to determine efficiency (%). This is a value that indicates how efficiently the active material is used.

(d) Slope of Discharge Curve

The discharge capacity X (Ah/g) corresponding to 0.2 V to 1.1 V in terms of a lithium reference electrode standard was determined, and this was divided by the potential difference of X, to calculate the slope of the discharge curve 0.9/X (Vg/Ah).

Working Example 1

First, 70 kg of a petroleum pitch with a softening point of 205° C. and an H/C atomic ratio of 0.65 and 30 kg of naphthalene were charged into a pressure-resistant container with an internal volume of 300 liters and having a stirring blade and an outlet nozzle, and after the substances were melted and mixed while heating at 190° C., the mixture was cooled to 80 to 90° C. The inside of the pressure-resistant container was pressurized by nitrogen gas, and the content was extruded from the outlet nozzle to obtain a string-shaped compact with a diameter of approximately 500 µm. Next, this string-shaped compact was pulverized so that the ratio (L/D) of the diameter (D) and the length (L) was approximately 1.5, and the resulting pulverized product was added to an aqueous solution in which 0.53 mass % of polyvinyl alcohol (degree of saponification: 88%) heated to 93° C. is dissolved, dispersed while stirring, and cooled to obtain a spherical pitch compact slurry. After the majority of the water was removed by filtration, the naphthalene in the pitch compact was extracted with n-hexane in a quantity of 6 times the mass of the spherical pitch compact. Using a fluidized bed, the porous spherical pitch obtained in this manner was heated to 240° C. and held for 1 hour at 240° C. while hot air was passed through to oxidize, thereby producing heat-infusible porous spherical oxidized pitch. Then, 100 g of the porous spherical oxidized pitch was placed in a vertical tube furnace 50 mm in diameter, and heated to 600° C. at a heating rate of 100° C./h. It was held at 600° C. for 1 hour to perform pre-heat treatment, and a carbon precursor was obtained. Pre-heat treatment was performed in a nitrogen atmosphere with a flow rate of 5 L/min. The obtained carbon precursor was pulverized, to produce a powdered carbon precursor with an average particle size of 4.8 µm. Next, 10 g of this powdered carbon precursor was placed in a horizontal tubular furnace with a diameter of 100 mm and heated to 1200° C. at a heating rate of 250° C./h. This was held for 1 hour at 1200° C. and subjected to final heat treatment to prepare a carbonaceous material 1. Final heat treatment was performed in a nitrogen atmosphere with a flow rate of 10 L/min.

Working Example 2

A carbonaceous material 2 was obtained by the same method as Working Example 1 except that the nitrogen flow rate during final heat treatment was changed to 1 L/min.

Working Example 3

A carbonaceous material 3 was obtained by the same method as Working Example 1 except that the porous spherical pitch oxidation temperature was changed to 230° C. and the pulverized particle size of the carbon precursor was set to 9.5 µm.

Working Example 4

A carbonaceous material 4 was obtained by the same method as Working Example 1 except that the porous spherical pitch oxidation temperature was changed to 210° C. and the pulverized particle size of the carbon precursor was set to 12.0 µm.

Working Example 5

A carbonaceous material 5 was obtained by the same method as Working Example 3 except that the porous spherical pitch oxidation temperature was changed to 205° C.

Working Example 6

A carbonaceous material 6 was obtained by the same method as Working Example 1 except that the pulverized particle size of the carbon precursor was changed to 3 µm.

Working Example 7

A carbonaceous material 7 was obtained by the same method as Working Example 1 except that the pulverized particle size of the carbon precursor was changed to 14 µm.

Working Example 8

Coal pitch having a softening point of 205° C. and an H/C atomic ratio of 0.49 was pulverized in a counter jet mill (100-AFG, manufactured by Hosokawa Micron Corporation), to produce powdered pitch with an average particle size of 6.2 µm. Then, this powdered pitch was placed in a muffle furnace (Denken Co., Ltd.), and held for 1 hour at 260° C. while passing through air at a rate of 20 L/min to perform infusibilization treatment, and infusibilized pitch was obtained. 100 g of the obtained infusibilized pitch was placed in a crucible, and in a vertical tube furnace with a diameter of 50 mm, it was heated to 600° C. at a heating rate of 50° C./h. It was held at 600° C. for 1 hour to perform pre-heat treatment, and a carbon precursor was obtained. Pre-heat treatment was performed in a nitrogen atmosphere with a flow rate of 5 L/min with the crucible in an open state. Next, 10 g of the carbon precursor was placed in a horizontal tubular furnace with a diameter of 100 mm and heated to 1200° C. at a heating rate of 250° C./h. This was held for 1 hour at 1200° C. and subjected to final heat treatment to prepare a carbonaceous material 8. Final heat treatment was performed in a nitrogen atmosphere with a flow rate of 10 L/min.

Working Example 9

A carbonaceous material 9 was obtained by the same method as Working Example 8 except that the infusibilization temperature was changed to 240° C. and the pulverized particle size of the carbon precursor was set to 9.0 µm.

Working Example 10

An aqueous dispersion solvent containing 250 g of a 4% methylcellulose aqueous solution and 2.0 g of sodium nitrite was prepared in 1695 g of water. On the other hand, a monomer mixture containing 500 g of acrylonitrile and 2.9 g of 2,2'-azobis-2,4-dimethylvaleronitrile was prepared. An aqueous dispersion solvent was added to this monomer mixture and stirred for 15 minutes at 2000 rpm with a homogenizer to produce micro-droplets of the monomer mixture. An aqueous dispersion solvent containing the micro-droplets of this polymerizable mixture was loaded into a polymerization tank with a stirrer (10 L) and then polymerized for 20 hours at 55° C. using a warm bath. After the resulting polymerization product was filtered from the aqueous phase, the product was dried and run through a sieve to form a spherical synthetic resin with an average particle size of 40 µm.

The resulting synthetic resin was subjected to oxidation treatment while passing the sample through heated air and maintaining the product at 250° C. for 5 hours, and a heat-infusible precursor was thus obtained. This was fired at up to 800° C. at a heating rate of 100° C./h in a nitrogen gas atmosphere and then pulverized with a counter jet mill (100-AFG manufactured by Hosokawa Micron Corporation), to produce a powdered carbon precursor. Next, 10 g of the pre-fired pulverized carbon precursor was placed in a horizontal tubular furnace with a diameter of 100 mm and heated to 1200° C. at a heating rate of 250° C./h. This was held for 1 hour at 1200° C. and subjected to final heat treatment to prepare a carbonaceous material 10.

Working Example 11

An electrode produced by an anode mixture prepared by adding water to 96 parts by mass of the carbonaceous material 4 obtained in Working Example 4, 3 parts by mass of SBR, and 1 part by mass of CMC was evaluated by the same method as Working Example 4.

Comparative Example 1

A comparative carbonaceous material 1 was obtained by the same method as Working Example 1 except that the porous spherical pitch oxidation temperature was changed to 270° C., the pulverized particle size of the carbon precursor was set to 10 µm, and the powdered carbon precursor was fired for 1 hour at 1200° C. under reduced pressure of $1.3 \times 10^{-5}$ kPa.

Comparative Example 2

30 g of the same powdered carbon precursor as Comparative Example 1 was put in a cylindrical crucible measuring 40 mm in diameter and 60 mm in height at the sample holding part. The input port was sealed with a carbon sheet, and carbonization was performed in a state where the gas produced during the carbonization reaction remained in the crucible. The crucible was put in an electric furnace, and after evacuating the furnace interior and purging with nitrogen gas, a nitrogen gas atmosphere was set in the electric furnace and it was heated to 1200° C. at a heating rate of 250° C./h and then held at 1200° C. for 1 hour, to produce a comparative carbonaceous material 2.

Comparative Example 3

A comparative carbonaceous material 3 was obtained by the same method as in Working Example 1 with the exception that the final heat treatment temperature was set to 1450° C.

Comparative Example 4

A comparative carbonaceous material 4 was obtained by the same method as in Working Example 1 with the exception that the final heat treatment temperature was set to 800° C.

Comparative Example 5

A comparative carbonaceous material 5 was obtained by the same method as in Comparative Example 2 with the exception that the porous spherical pitch oxidation temperature was set to 223° C.

Comparative Example 6

A comparative carbonaceous material 6 was obtained by the same method as in Comparative Example 2 with the exception that the porous spherical pitch oxidation temperature was set to 215° C.

The results of measuring the characteristics of the carbonaceous materials obtained in the working examples and comparative examples and the performance of the electrodes and batteries produced using them are shown in Table 1.

TABLE 1

| | $d_{002}$ [nm] | H/C | $\rho_{Bt}$ [g/cm³] | $\rho_{He}$ [g/cm³] | $\rho_{He}/\rho_{Bt}$ | $D_{v50}$ [μm] | SSA (BET) [m²/g] | SSA (CALC) [m²/g] |
|---|---|---|---|---|---|---|---|---|
| Working Example 1 | 0.380 | 0.02 | 1.56 | 2.04 | 1.31 | 4.6 | 10.2 | 0.84 |
| Working Example 2 | 0.379 | 0.02 | 1.56 | 2.05 | 1.31 | 4.5 | 10.0 | 0.85 |
| Working Example 3 | 0.377 | 0.02 | 1.60 | 2.00 | 1.25 | 9.0 | 5.0 | 0.42 |
| Working Example 4 | 0.374 | 0.02 | 1.63 | 1.99 | 1.22 | 11.7 | 2.6 | 0.31 |
| Working Example 5 | 0.373 | 0.02 | 1.67 | 1.85 | 1.11 | 9.0 | 4.5 | 0.40 |
| Working Example 6 | 0.377 | 0.02 | 1.59 | 2.02 | 1.27 | 3.1 | 15.3 | 1.22 |
| Working Example 7 | 0.377 | 0.02 | 1.59 | 2.01 | 1.26 | 14.0 | 3.0 | 0.27 |
| Working Example 8 | 0.381 | 0.02 | 1.64 | 2.04 | 1.24 | 5.6 | 4.3 | 0.65 |
| Working Example 9 | 0.370 | 0.02 | 1.67 | 1.92 | 1.15 | 8.3 | 5.0 | 0.43 |
| Working Example 10 | 0.374 | 0.02 | 1.60 | 1.85 | 1.16 | 14.0 | 2.5 | 0.27 |
| Working Example 11 | 0.374 | 0.02 | 1.63 | 1.99 | 1.22 | 11.7 | 2.6 | 0.31 |
| Comparative Example 1 | 0.382 | 0.02 | 1.52 | 2.10 | 1.38 | 10.1 | 4.6 | 0.39 |
| Comparative Example 2 | 0.381 | 0.02 | 1.52 | 1.96 | 1.29 | 10.0 | 3.2 | 0.39 |
| Comparative Example 3 | 0.376 | 0.01 | 1.55 | 1.75 | 1.13 | 4.7 | 6.8 | 0.82 |
| Comparative Example 4 | 0.405 | 0.12 | 1.50 | 1.84 | 1.23 | 4.8 | 69.0 | 0.83 |
| Comparative Example 5 | 0.379 | 0.02 | 1.57 | 1.75 | 1.11 | 10.0 | 1.4 | 0.38 |
| Comparative Example 6 | 0.374 | 0.02 | 1.63 | 1.70 | 1.04 | 9.0 | 1.5 | 0.41 |

| | Specific surface area ratio BET/CALC | Absorbed moisture quantity [wt %] | Charge Capacity | Discharge at 0.05 to 1.5 V | Irreversible [mAh/g] |
|---|---|---|---|---|---|
| Working Example 1 | 12.2 | 0.69 | 245 | 204 | 45 |
| Working Example 2 | 11.7 | 0.66 | 235 | 194 | 41 |
| Working Example 3 | 12.0 | 0.14 | 236 | 208 | 28 |
| Working Example 4 | 8.3 | 0.13 | 237 | 210 | 27 |
| Working Example 5 | 11.3 | 0.12 | 239 | 212 | 27 |
| Working Example 6 | 12.6 | 0.16 | 267 | 221 | 47 |

TABLE 1-continued

| | | | | | |
|---|---|---|---|---|---|
| Working Example 7 | 11.1 | 0.14 | 233 | 208 | 25 |
| Working Example 8 | 6.6 | 0.11 | 251 | 213 | 48 |
| Working Example 9 | 11.6 | 0.10 | 253 | 208 | 45 |
| Working Example 10 | 9.3 | 0.23 | 245 | 200 | 45 |
| Working Example 11 | 8.3 | 0.13 | 244 | 217 | 27 |
| Comparative Example 1 | 11.8 | 2.8 | 245 | 200 | 45 |
| Comparative Example 2 | 8.1 | 2.0 | 209 | 168 | 41 |
| Comparative Example 3 | 8.3 | 0.19 | 189 | 157 | 32 |
| Comparative Example 4 | 82.8 | 10 | 455 | 246 | 209 |
| Comparative Example 5 | 3.7 | 0.38 | 187 | 158 | 28 |
| Comparative Example 6 | 3.7 | 0.10 | 179 | 155 | 24 |

| | Efficiency [%] | Discharge capacity per unit volume [mAh/cm$^3$] | Discharge capacity (X) at 0.2 to 1.1 V [Ah/g] | Slope of discharge curve 0.9/X [Vg/Ah] |
|---|---|---|---|---|
| Working Example 1 | 82.0 | 318 | 1.37 | 0.66 |
| Working Example 2 | 82.4 | 303 | 1.31 | 0.69 |
| Working Example 3 | 88.0 | 333 | 1.42 | 0.63 |
| Working Example 4 | 88.6 | 342 | 1.44 | 0.63 |
| Working Example 5 | 88.8 | 354 | 1.47 | 0.61 |
| Working Example 6 | 82.6 | 351 | 1.52 | 0.59 |
| Working Example 7 | 89.3 | 331 | 1.43 | 0.63 |
| Working Example 8 | 81.6 | 349 | 1.41 | 0.64 |
| Working Example 9 | 82.3 | 348 | 1.41 | 0.64 |
| Working Example 10 | 81.6 | 320 | 1.42 | 0.63 |
| Working Example 11 | 88.9 | 354 | 1.43 | 0.63 |
| Comparative Example 1 | 81.7 | 304 | 1.29 | 0.70 |
| Comparative Example 2 | 80.3 | 255 | 1.14 | 0.79 |
| Comparative Example 3 | 82.9 | 243 | 1.08 | 0.83 |
| Comparative Example 4 | 54.0 | 369 | 1.51 | 0.60 |
| Comparative Example 5 | 84.9 | 249 | 1.08 | 0.84 |
| Comparative Example 6 | 86.7 | 253 | 1.06 | 0.85 |

The carbonaceous materials of Working Examples 1 to 11 had a true density ($\rho_{Bt}$) of not less than 1.55 g/cm$^3$ and less than 1.75 g/cm$^3$ and a discharge capacity at 0.05 V to 1.5 V of not less than 180 mAh/g, and the slope of the discharge curve 0.9/X corresponding to 0.2 V to 1.1 V was not greater than 0.75 (Vg/Ah). This demonstrates that the slope of the discharge curve per unit volume is gentle in the most useful range of potential in a vehicular lithium-ion secondary battery, namely from 0.2 V to 1.1 V, and as a result, the potential difference between the anode and the cathode is maintained at a high level in a state when used in a charge region of about 50%, and high discharge capacity per unit volume is exhibited. Furthermore, the absorbed moisture quantity was low. For this reason, Working Examples 1 to 10 had high discharge capacity per unit volume and storage characteristics in the range of practical use.

In contrast, Comparative Examples 1, 2, and 4 had a true density ($\rho_{Bt}$) of less than 1.55 g/cm$^3$ and the voids were large in the crystal structure, and as a result, the moisture-absorbing portion was large, resulting in a high absorbed moisture quantity. Furthermore, Comparative Example 2 had a low discharge capacity at 0.05 V to 1.5 V. Although the true densities ($\rho_{Bt}$) of Comparative Examples 3, 5, and 6 were within the range of the present invention, discharge capacity at 0.05 V to 1.5 V was low. Furthermore, because the slope of the discharge curve (0.9/X) was high in Comparative Examples 2, 3, 5, and 6, capacity in the slope region of practical use could not be sufficiently assured.

The invention claimed is:

1. A carbonaceous material for a non-aqueous electrolyte secondary battery anode wherein the carbonaceous material is obtained by a method comprising an infusibilization step, wherein at least one selected from the group consisting of a petroleum pitch or tar, coal pitch or tar, and thermoplastic resin is infusibilized at a temperature of from 120 to 260° C. to obtain a carbonaceous precursor and a final heat treatment step, wherein the carbonaceous precursor is heated at a temperature of from 900 to 1250° C. to perform the final heat treatment, a true density $\rho_{Bt}$ of said battery anode is determined by a pycnometer method using butanol is not less than 1.55 g/cm$^3$ and less than 1.75 g/cm$^3$ and a discharge capacity of an anode at 0.05 V to 1.5 V in terms of a lithium reference electrode standard is not less than 180 mAh/g, a slope 0.9/X (Vg/Ah) of a discharge curve calculated from a discharge capacity X (Ah/g) and a potential difference of 0.9 (V) corresponding to 0.2 V to 1.1 V being not greater than 0.69 (Vg/Ah), and an absorbed moisture quantity after storage for 100 hours in a 25° C. 50% RH air atmosphere being not greater than 1.5 wt %.

2. The carbonaceous material for a non-aqueous electrolyte secondary battery anode according to claim 1, wherein a true density ($\rho_{He}$) determined by a helium replacement method is not less than 1.76 g/cm$^3$.

3. The carbonaceous material for a non-aqueous electrolyte secondary battery anode according to claim 1, wherein a ratio ($\rho_{He}/\rho_{Bt}$) of $\rho_{He}$ and $\rho_{Bt}$ is not less than 1.10.

4. The carbonaceous material for a non-aqueous electrolyte secondary battery anode according to claim 1, wherein a specific surface area ratio (BET/CALC) of a specific surface area (BET) (unit: m$^2$/g) determined by a BET method by nitrogen gas adsorption and a specific surface area (CALC) (unit: m$^2$/g) obtained by a formula 6/(D$_{v50}$×$\rho_{Bt}$) when an average particle size (unit: μm) is taken as D$_{v50}$ is greater than 5.5.

5. The carbonaceous material for a non-aqueous electrolyte secondary battery anode according to claim 1, wherein an average particle size is not less than 1 μm and not greater than 15 μm.

6. A non-aqueous electrolyte secondary battery anode comprising the carbonaceous material for a non-aqueous electrolyte secondary battery anode described in claim 1.

7. A non-aqueous electrolyte secondary battery comprising the non-aqueous electrolyte secondary battery anode described in claim 6.

8. A vehicle in which the non-aqueous electrolyte secondary battery described in claim 7 is mounted.

* * * * *